United States Patent [19]
Vos

[11] Patent Number: 5,129,336
[45] Date of Patent: Jul. 14, 1992

[54] ECCENTRIC ADJUSTING APPARATUS FOR A TREE SPADE

[75] Inventor: Stephen J. Vos, Pella, Iowa

[73] Assignee: Vermeer Manufacturing Company, Pella, Iowa

[21] Appl. No.: 716,243

[22] Filed: Jun. 17, 1991

[51] Int. Cl.⁵ .................. A01G 23/02; A01C 11/00
[52] U.S. Cl. ............................. 111/101; 403/DIG. 8
[58] Field of Search ............... 111/101, 918; 37/2 R; 172/20; 403/4, 409.1, DIG. 8, 161-162; 171/5, 21, 22, 47

[56] References Cited

U.S. PATENT DOCUMENTS

| | | | |
|---|---|---|---|
| 3,738,431 | 6/1973 | Gennow | 172/20 |
| 4,226,033 | 10/1980 | Dettaan | 111/101 |
| 4,341,025 | 7/1982 | Stooker | 111/101 |
| 4,351,252 | 9/1882 | Dahlquist | 111/101 |
| 4,403,427 | 9/1983 | Dahlquist | 111/101 |
| 4,443,023 | 4/1984 | Ishibashi | 403/DIG. 8 |
| 4,997,303 | 3/1991 | Xu et al. | 403/4 |

OTHER PUBLICATIONS

Vermeer, "the Digging Dutchman", 37/2R, May 1976.

*Primary Examiner*—Randolph A. Reese
*Assistant Examiner*—Spencer Warnick
*Attorney, Agent, or Firm*—Kent A. Herink; Brian J. Laurenzo

[57] ABSTRACT

An eccentric adjusting apparatus for a tree spade which includes a plurality of blades mounted for upward and downward movement on mounting blocks which travel in longitudinal channels of an associated plurality of upright towers. A pair of eccentric pins are used to mount the blades to the mounting blocks. Pivotal movement of the eccentric pins permits quick and easy adjustment of the blades to assist in maintaining the desired alignment of the blades along their adjoining edges and at a common vertex.

8 Claims, 3 Drawing Sheets

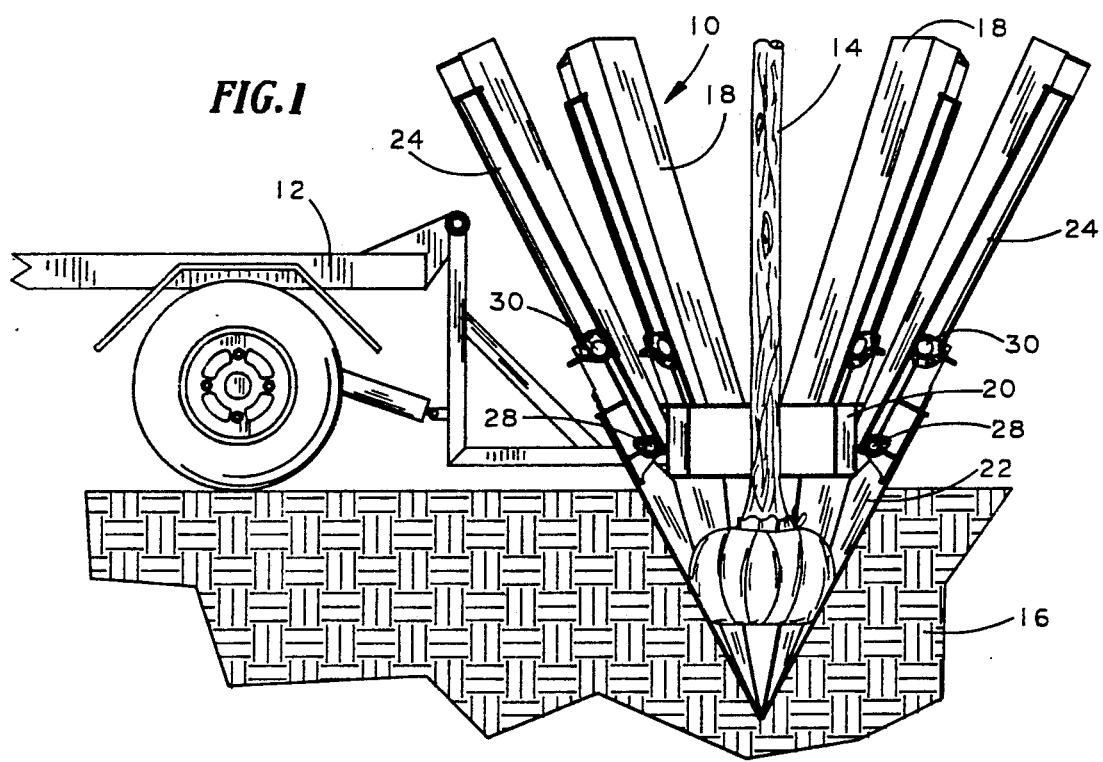
FIG. 1
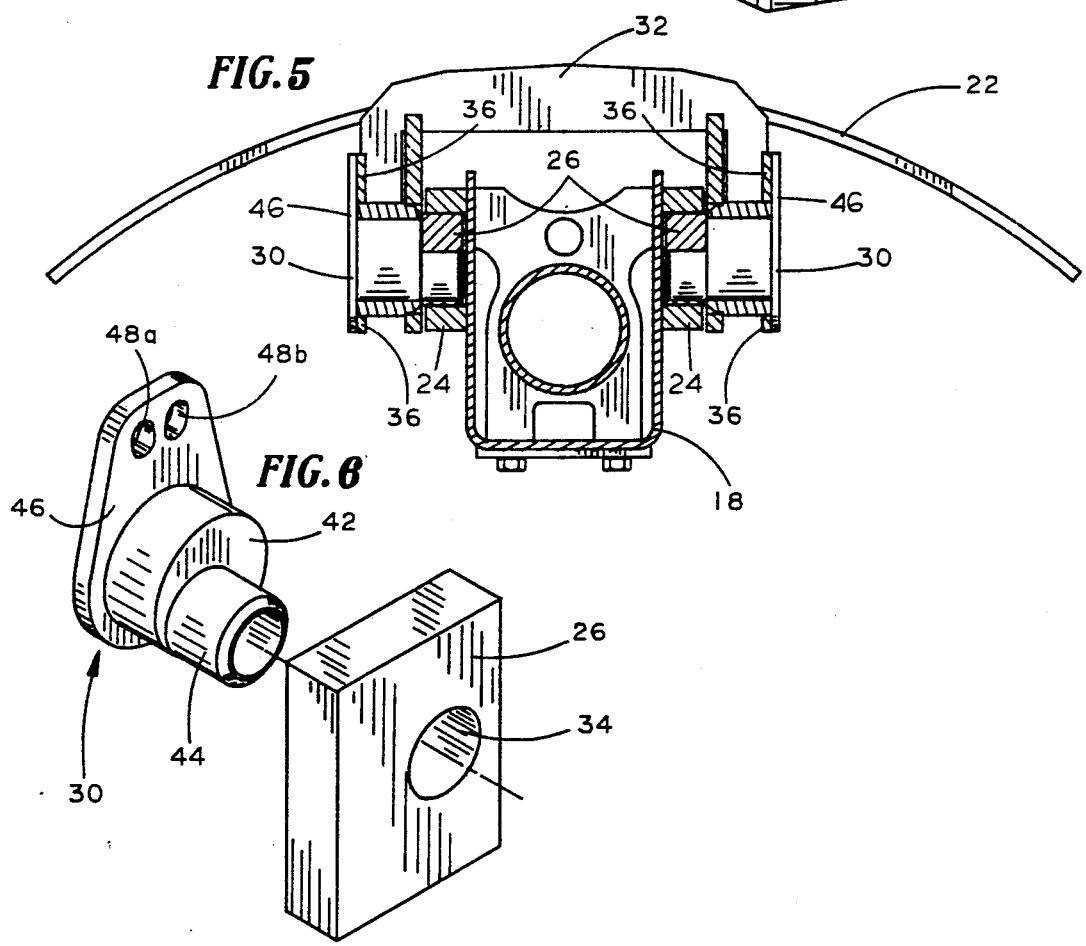
FIG. 5
FIG. 6

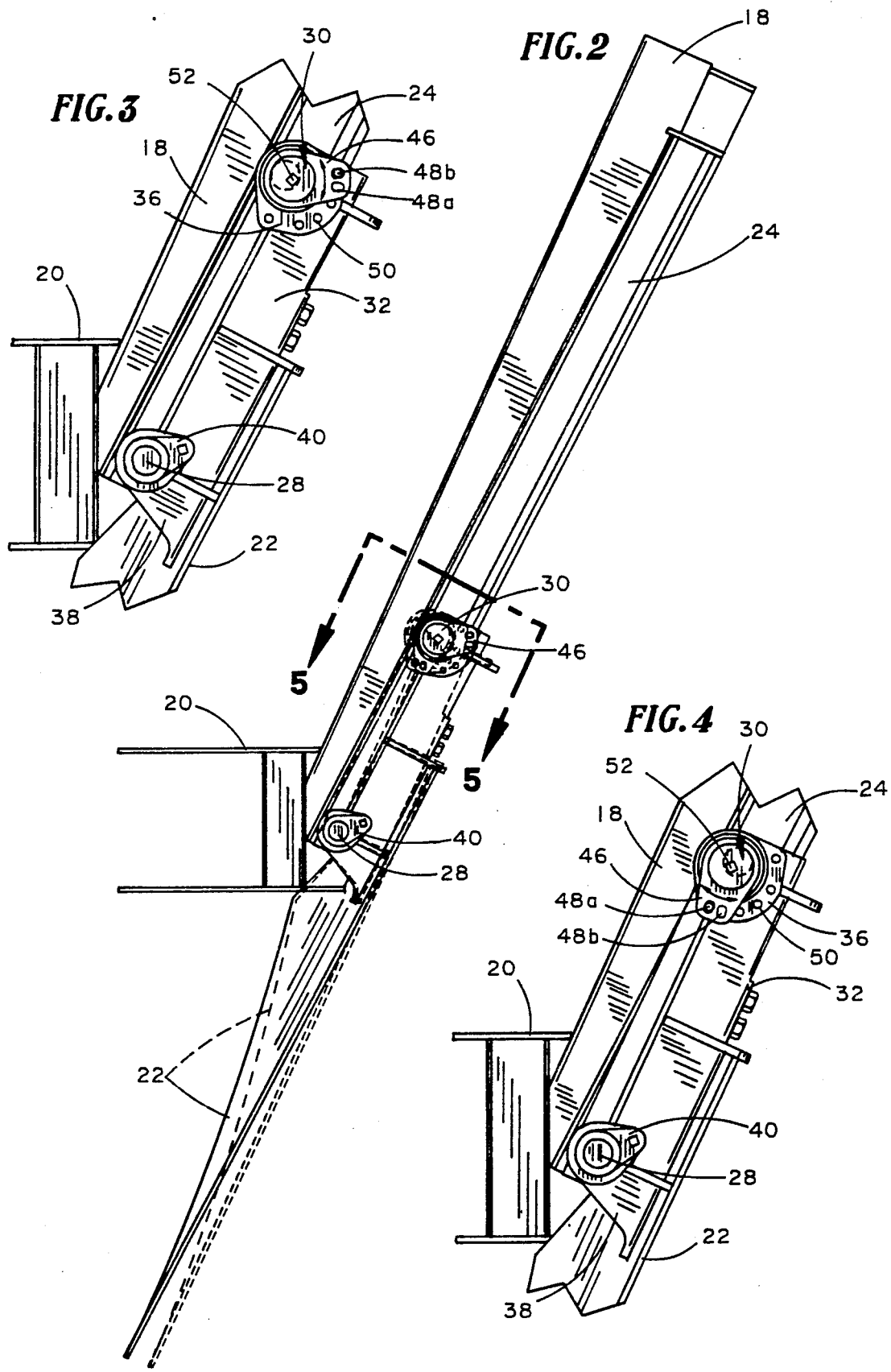

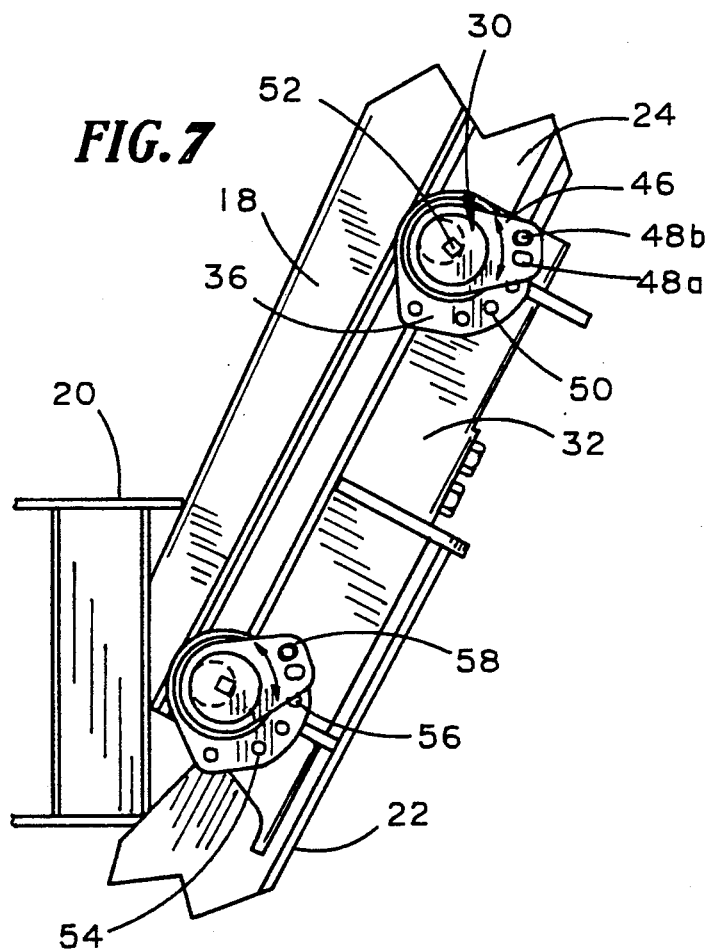

ECCENTRIC ADJUSTING APPARATUS FOR A TREE SPADE

BACKGROUND OF THE INVENTION

The invention relates to tree spades and, more specifically, to a mechanism for mounting the individual blades of a tree spade that is adjustable to correct and maintain the desired alignment of the individual blades.

The use of tree spades for removing, transporting, and transplanting growing sizeable trees is well known. The tree spades most typically employ a plurality of upright towers supported on a ring structure which can be separated and opened to encircle a tree. The towers each support a blade which are moved upwardly and downwardly on the towers for extraction and insertion into the earth surrounding the tree. Upon insertion of the blades, any intervening roots of the tree are severed and a substantially conical shaped mass of earth is extracted together with the tree.

For efficient operation, the blades must be appropriately aligned so that they meet at a common vertex and along adjoining sides when fully extended into the earth. Not only is it difficult in the original fabrication of the tree spade to position the towers consistently and precisely so that the individual blades are all aligned, but ordinary use and wear of the tree spade will result eventually in some misalignment. In existing tree spades, it has been necessary either to cut apart and reweld portions of blade mounting brackets or align the towers by means of adjustment bolts or the like to correct such misalignments. With the present invention, alignment is simply and quickly achieved by pivotal movement of one or more eccentric clamps used in the mounting of the individual blades to the towers.

SUMMARY OF THE INVENTION

The invention consists of an eccentric adjusting mechanism for the adjustment of individual blades of a tree spade to correct and maintain the desired alignment of the blades. The tree spade includes a plurality of towers which are mounted on a vertically movable ring member. Each tower supports a blade for extension and retraction relative to the ring member that, when extended, penetrates the earth to separate the tree and an adjoining portion of dirt from its present location. A longitudinal track is supported on either side of the towers. Each track has a channel in which is received a pair of mounting blocks for sliding movement upwardly and downwardly relative to the towers inside the track. A mounting bracket on the upper portion of the blade has a pair of mounting ears that extend inwardly on either side of the blade for releasable attachment to the mounting blocks. An eccentric mounting pin is used to mount the ears of the blade mounting bracket to the sliding mounting blocks. The eccentric pin has two cylindrical sections one of which is offset from the longitudinal center line of the other. One of the sections is received in an opening therefor in the mounting block and the other cylindrical section is received in a corresponding opening therefor in the mounting ear. Pivotal movement of the eccentric mounting pin, accordingly, will move the mounting ear relative to the mounting block. By appropriate pivotal movement of the eccentric mounting pins, the blade is alignable relative to the tower and adjacent blades. Releasable securement means are provided to secure the eccentric mounting pin in any of a plurality of adjusted positions.

It is, accordingly, an object of the present invention to provide means for correcting and maintaining the alignment of individual blades of a tree spade.

Another object of the invention is to provide an eccentric mounting pin for mounting of an individual blade of a tree spade to a tower thereof for correcting and maintaining the alignment of the blade.

A further object of the invention is to provide a pair of eccentric mounting pins used on either side of the blade to provide for adjustment of the blade toward and away from the central axis of the spade.

Yet another object of the invention is to provide a means for adjusting the alignment of an individual blade of a tree spade that may be quickly and easily done without disassembly or cutting of the blade mounting assembly.

These and other objects of the invention will be obvious to a person skilled in the art upon review of the description of the invention included herein.

BRIEF DESCRIPTION OF THE DRAWINGS

FIG. 1 is a side view of a tree spade shown in use transplanting a tree wherein the eccentric clamping mechanism of the present invention has been used to mount the individual blades on the towers;

FIG. 2 is a side elevational view of a tower showing the adjustment of the blade between a position shown in solid line and a position shown in broken line;

FIG. 3 is a side elevational view of an individual blade mounted to a tower of the tree spade;

FIG. 4 is a side elevational view corresponding to FIG. 3 wherein the eccentric pin has been pivoted to adjust the position of the blade;

FIG. 5 is a cross sectional view taken along line 5—5 of FIG. 2;

FIG. 6 is an enlarged perspective view of an eccentric pin and a mounting block; and FIG. 7 is a side elevational view of an individual blade mounted to a tower of the tree spade and showing use of eccentric pins in both upper and lower mounting ears of the blade.

DETAILED DESCRIPTION OF A PREFERRED EMBODIMENT

Illustrated in FIG. 1, indicated generally at 10, is a tree spade which is mounted on a truck bed 12. The tree spade 10 is shown transplanting a tree 14 in the ground 16. The general structure and function of tree spades of the type illustrated in FIG. 1 is described in U.S. Pat. No. 4,226,033, entitled Tree Transplanting Machine, which is incorporated herein by this reference.

The tree spade 10 of the present invention includes a plurality of upright towers 18 that are supported on a split circular ring 20. Supported for up and down vertical movement on each of the towers 18 is a blade 22, which in FIG. 1 are shown in the fully extended or lower position inserted into the ground 16. When properly adjusted, the blades 22 form a substantially conical structure wherein they meet at a common vertex and along adjoining sides.

In the manufacture of the tree spade 10, to achieve the desired alignment of the blades 22, it is necessary to accurately and consistently position the towers 18. Even if the towers 18 and blades 22 are originally aligned, use and wear of the tree spade 10 will eventually result in some misalignment of the blades 22. The misalignment can become severe enough to adversely affect the performance of the tree spade. For example, some of the roots of the tree may not be severed upon full extension of the blades 22 with the result that the tree will be difficult or impossible to remove.

Each of the towers 18 supports a channel 24 on either side thereof and extending substantially the full length of the tower 18 (FIGS. 1-4). A pair of mounting blocks, one of which is illustrated at 26 in FIG. 6, are received for sliding movement inside each of the channels 24. The mounting blocks 26 are used to support the blades 22 on the towers 18 by two pairs of mounting pins, lower, cylindrical pins 28 and upper, eccentric pins 30 (FIG. 6). The proximal end portions of the pins 28 and 30 are received in a circular opening 34 in the mounting blocks 26. While the drawings illustrate the opening 34 as offset, the opening 34 can be centered on the blocks 26.

The blades 22, one of which is illustrated in FIG. 5, include a mounting bracket 32 that has two pair of oppositely spaced mounting ears, upper ears 36 and lower ears 38, that extend inwardly toward the tower 18. The mounting ears 36 and 38 have a circular pin-receiving opening that is aligned with the opening 34 of a corresponding one of the mounting blocks 26. The blades 22 are mounted to the towers 18 by inserting the pins 28 and 30 in the aligned openings of the mounting ears and the mounting blocks.

The lower, cylindrical pins 28 have a radially extended attachment ear 40 that is secured by a bolt or similar releasable attachment means to the mounting ear 38.

The upper, eccentric pins 30 have two cylindrical portions, a larger diameter distal portion 42 and a smaller diameter proximal portion 44. The proximal portion 44 is received in the opening 34 of the upper mounting block 26 and the distal portion 42 is received in the opening of the mounting ear 36. The longitudinal axis of the proximal portion 44 is offset from the longitudinal axis of the distal portion 42. Accordingly, as the eccentric pin 30 is pivoted, the mounting ear 36 will be moved relative to the upper mounting block 26. Because the lower mounting ears 38 are held in a fixed position relative to the lower mounting blocks 26 by the cylindrical pins 28, pivotal movement of the eccentric pins 30 will pivot the blade 22 about the pins 28 to alter the orientation of the blade 22 relative to the tower 18. The range of this motion is illustrated in FIGS. 2-4.

Extended transversely of the distal portion 42 of the eccentric pin 30 is an attachment ear 46 which includes a pair of bolt holes 48a and 48b. The upper mounting ear 36 of the blade mounting bracket 32 includes a plurality of bolt holes 50. As the eccentric pin 30 is pivoted, successive ones of the bolt holes 50 of the mounting ear 36 are brought into and out of alignment with the bolt holes 48 of the eccentric pin 30. The blade 22 can, accordingly, be fixed in any of the plurality of adjusted positions by insertion of a bolt or similar releasable attachment means in the selected aligned openings 48 and 50. A square recess 52 is provided in the pins 30 which is engageable by a ratchet wrench to facilitate pivotal movement of the pins 30.

The maximum inward position of the tip of the blade 22 is achieved when the eccentric pin 30 on one side of the blade 22 is pivoted to the position illustrated in FIG. 3, wherein the bolt hole 48a is aligned with the uppermost bolt hole 50 of the upper mounting ear 36, and the other eccentric pin (not shown) on the other side of the blade 22 is similarly pivoted. In this position, the longitudinal axis of the proximal portion 44 of the eccentric pin 30 is inward of the longitudinal axis of the distal portion 42 so that the upper end portion of the blade 22 is moved outwardly relative to the channel 24 and the tower 18. As the eccentric pins 30 are pivoted in the direction to move the longitudinal axis of the distal portion 42 inwardly relative to the proximal portion 44, the upper end portion of the blade 22 will be moved inwardly and the vertex of the blade 22 will move from the solid line position to the broken line position of FIG. 2. The maximum outward position of the vertex has the eccentric pin 30 pivoted so that the bolt opening 48b is aligned with the lowermost bolt opening 50 of the mounting ear 36, one of which is illustrated in FIG. 4.

An eccentric pin 30 is used on both sides of the mounting bracket 32, and the pins 30 are pivoted together so that the blade 22 is tipped inwardly and outwardly relative to the central axis of the tree spade. In the preferred embodiment, only a pair of eccentric pins 30 are employed in association with the upper mounting ears 36. The pair of eccentric pins 30 could also be effectively used in association with the lower mounting ears 38, with traditional cylindrical pins 28 being used with the upper mounting ears 36.

In an alternative embodiment, a pair of lower mounting ears 54 are made identical to the upper mounting ears 36, including a plurality of bolt holes 56 (FIG. 7). A second pair of eccentric pins 58, identical in construction to the upper eccentric pins 30, are used in the lower mounting ears 54. With this arrangement, the range of motion of the tip of the blade 22 (FIG. 2) can be increased.

Although the invention has been described with respect to a preferred embodiment thereof, it is to be also understood that it is not to be so limited since changes and modifications can be made therein which are within the full intended scope of this invention as defined by the appended claims.

We claim:

1. An eccentric adjusting apparatus for adjusting a tree spade blade that is mounted on a tower of the tree spade for movement between a retracted, upper position and an extended, lower position, the eccentric clamping apparatus comprising:
   (a) track means on the tower and means for mounting the blade to said track means:
   (b) an eccentric pin having a first cylindrical section received for pivotal movement in said mounting means and a second cylindrical section received for pivotal movement in said track means whereby pivotal movement of said eccentric pin moves said mounting means relative to said track means; and
   (c) means for securing said eccentric pin in a plurality of pivoted positions.

2. An eccentric adjusting apparatus as defined in claim 1, wherein said track means includes a channel on a side of the tower and a block member that is received for sliding movement inside said channel.

3. An eccentric adjusting apparatus as defined in claim 2, wherein one each of a pair of said channels is located on either side of the tower.

4. An eccentric adjusting apparatus as defined in claim 2 wherein said mounting means includes a mounting bracket secured to the blade and having an inwardly extended ear.

5. An eccentric adjusting apparatus as defined in claim 4, wherein said ear has a throughbore which receives said first cylindrical section and said block member has a cylindrical bore which receives said second cylindrical section of said eccentric pin.

6. An eccentric adjusting apparatus as defined in claim 5, wherein said securing means includes a transversely extended flange of said eccentric pin which moves in an arc adjacent said ear upon pivotal movement of said eccentric pin, a plurality of one or more openings in said flange, a plurality of coacting alignment openings in said ear, and an alignment pin for insertion into a pair of aligned openings in said flange and said ear.

7. An eccentric adjusting apparatus for adjusting a tree spade blade that is mounted on a tower of the tree spade for movement between a retracted, upper position and an extended, lower position, the eccentric adjusting apparatus comprising:

(a) a pair of channels one each of which is located on either side of said tower;

(b) a pair of block members received for sliding movement in each of said channels;

(c) a mounting bracket secured to the blade and including an upper pair and a lower pair of ears that extend inwardly adjacent said channels;

(d) a cylindrical bore in each of said block members and a throughbore in each of said ears;

(e) an eccentric pin associated with each of said ears and having a first cylindrical section received for pivotal movement in said cylindrical bore of one of said block members and a second cylindrical section received for pivotal movement in a corresponding one of said ears;

(f) a transversely extended flange of said eccentric pin that moves in an arc adjacent the corresponding one of said ears upon pivotal movement of said pin;

(g) a plurality of alignment openings in said flanges and said ears; and (h) an alignment pin for insertion into aligned openings of said flange and said ear to secure said eccentric pin in a plurality of pivoted positions.

8. An eccentric adjusting apparatus as defined in claim 7 wherein said eccentric pin is used only in the upper pair of said ears on either side of the tower.

* * * * *